Patented Oct. 12, 1937

2,095,786

UNITED STATES PATENT OFFICE 2,095,786

PROCESS OF SEPARATING TRIMETHYLAMINE AND AMMONIA

Chester E. Andrews, Overbrook, and Robert N. Washburne, Philadelphia, Pa., assignors to Röhm & Haas Company, Philadelphia, Pa.

No Drawing. Application July 13, 1935, Serial No. 31,176

12 Claims. (Cl. 260—127)

This invention relates to a process for removing trimethylamine from mixtures in which it is present together with ammonia and possibly small amounts of monomethylamine and dimethylamine. It also relates to a process by which a considerable part of the trimethylamine may be converted into mono- and dimethylamine, which can be readily separated from the ammonia by fractional distillation.

In a catalytic process for the production of methylamines from ammonia and methanol the gases coming from the catalytic contact zone contain the three methylamines, water and any unreacted ammonia and methanol. The water and methanol are then removed and the mixture of ammonia and the three methylamines is liquefied and subjected to fractional distillation. The lowest boiling component of this mixture is the azeotropic mixture of ammonia and trimethylamine which contains about 75% of ammonia and 25% of trimethylamine. The next higher boiling fraction is practically pure ammonia which may contain small amounts of mono- and dimethylamines. The remaining material consists essentially of mono- and dimethylamines which may be readily separated by fractional distillation. Prior to distilling the reaction product the relative amounts of ammonia and trimethylamine are so regulated that all the trimethylamine is distilled off as the azeotropic mixture.

This azeotropic mixture cannot be separated into its components by fractional distillation and in order to recover the ammonia for further use in the production of the methylamines it is necessary to devise other methods. The separation of these two gases is economically necessary in the process of manufacturing the methylamines because if the azeotropic mixture were used as the source of ammonia for further production an excessive amount of trimethylamine would ultimately be built up.

It is an object of the present invention to provide a method for recovering the ammonia from this azeotropic mixture and from other mixtures of ammonia and trimethylamine which occur in the catalytic production of the methylamines from ammonia and methanol. The process is, of course, applicable to such mixtures irrespective of how they are obtained, irrespective of their composition.

It is a further object of this invention to provide a method for removing at least part of the trimethylamine from these mixtures by converting it to mono- and dimethylamines which are readily separated from the ammonia by fractional distillation. It is also an object of the invention to reduce the concentration of trimethylamine in its mixture with ammonia to or below a point at which it is economical to use the final mixture in the further catalytic production of the methylamines.

It has been found that when a mixture of ammonia and trimethylamine which may also contain small amounts of mono- and dimethylamines is heated to temperatures ranging from about 300° C. to about 500° C., preferably from 350° to 450° C., in the presence or absence of air or catalysts a considerable part of the trimethylamine is converted to mono- and dimethylamines and in some cases hydrogen cyanide is also formed, particularly in the presence of air. In the absence of air ethylene, methane and hydrogen may also be formed.

There are several factors which affect this process, viz:—temperature, time of heating or contact, (space velocity), catalysts and inert contact material, and when air or oxygen is present, the ratio of oxygen to trimethylamine. In order to operate this process to the best advantage it is necessary to take all these factors into consideration. The ideal conditions would permit the complete conversion of all the trimethylamine to mono- and dimethylamines which could then be fractionally distilled from the ammonia thus yielding practically pure ammonia and the two methylamines in a substantially pure state. This, however, is not attainable and the controlling factors are so adjusted as to give the highest possible conversion of the trimethylamine consistent with a high recovery of mono- and dimethylamines and of ammonia suitable for further reaction with methanol.

The process of the present invention may be carried out in any suitable apparatus capable of withstanding the pressures and temperatures used. The process may be carried out at any desired pressure, viz:—at atmospheric pressure, above or below it.

The following examples will illustrate the process and show in what way it is affected by variations in the several factors enumerated above. These examples are not intended to limit the invention to the exact conditions, catalyst, etc., shown since it may otherwise be practiced within the scope of the appended claims.

The following mixture of ammonia and the three methylamines was used in Examples 1 and 2:

|  | Percent by weight |
|---|---|
| Ammonia | 76.9 |
| Trimethylamine | 21.3 |
| Dimethylamine | 1.0 |
| Monomethylamine | 0.8 |

The following mixture of ammonia and the three methylamines was used in Examples 3 to 18 inclusive:

|  | Percent by weight |
|---|---|
| Ammonia | 78.1 |
| Trimethylamine | 20.3 |
| Dimethylamine | 0.7 |
| Monomethylamine | 0.9 |

Space velocity is the number of cubic centimeters of gas passed per hour per cubic centimeter of contact material, or per cubic centimeter of reaction zone when no contact material is used.

Example 1

The mixture of ammonia and amines was passed through an empty tube at 480° C. and at a space velocity of 105. 15.1% of the trimethylamine was decomposed and, of this amount 117 mol. % was recovered as mono- and dimethylamines.

Example 2

The mixture of ammonia and amines was passed over a catalyst of aluminum phosphate and aluminum oxide at 450° C. and a space velocity of 239. 48.9% of the trimethylamine was decomposed and of this amount 214 mol. % was recovered as mono- and dimethylamines.

Example 3

The mixture of ammonia and amines was passed over a catalyst consisting of sil-o-cel powder impregnated with secondary ammonium phosphate at 455° C. and a space velocity of 391. 30.3% of the trimethylamine was decomposed and of this amount 230 mol. % was recovered in the form of mono- and dimethylamines.

Example 4

The mixture of ammonia and amines was passed over a catalyst consisting of silica gel particles coated with manganese pyrophosphate, at 398° C. and a space velocity of 186. 27.5% of the trimethylamine was decomposed and of this amount 214 mol. % was recovered as mono- and dimethylamines.

These four examples illustrate the direct thermal decomposition of trimethylamine in the presence of a catalyst. The high recovery of mono- and dimethylamines, particularly as in Examples 2, 3 and 4, shows that there was a reaction between the trimethylamine and the ammonia forming more of the lower methylamines than could be obtained by the direct decomposition of the trimethylamine into a lower methylamine and ethylene.

Example 5

The mixture of ammonia and amines was mixed with air in such proportion that the molecular ratio of oxygen to trimethylamine was 2.67 and this mixture was passed through a reaction zone containing no contact material at 345° C. and a space velocity of 70. 66% of the trimethylamine was decomposed of which 61 mol. % was recovered as mono- and dimethylamines and 5.2% of the nitrogen in the bases used was converted to hydrogen cyanide.

Example 6

The process shown in Example 5 was carried out at 401° C., a space velocity of 65 and a molecular ratio of oxygen to trimethylamine of 2.21. 83% of the trimethylamine was decomposed of which 56 mol. % was recovered as mono- and dimethylamines. 7.8% of the nitrogen in the bases used was converted to hydrogen cyanide.

Example 7

The same process was carried out at 399° C., a space velocity of 176 and a molecular ratio of oxygen to trimethylamine of 4.00. 66.2% of the trimethylamine was decomposed of which 101.0% was recovered as mono- and dimethylamines. No hydrogen cyanide was formed.

Comparing Examples 5, 6 and 7 with 1 to 4 it is obvious that a larger fraction of the trimethylamine is decomposed in the presence of air than when none is present. However, the mol. per cent. of the trimethylamine recovered as primary and secondary amines is considerably less.

Example 8

The mixture of ammonia and amines was mixed with air so that the molecular ratio of oxygen to trimethylamine was 3.1 and this mixture was passed over eight to twelve mesh pumice particles at 409° C. and a space velocity of 245. The pumice was used as an inert contact material. 81% of the trimethylamine was decomposed of which 61.8 mol. % was recovered as mono- and dimethylamines.

Example 9

The process shown in Example 8 was carried out at 398° C., a molecular ratio of oxygen to trimethylamine of 2.69 and a space velocity of 435. 54.2% of the trimethylamine was decomposed, of which 116 mol. % was recovered as mono- and dimethylamines.

A comparison of Example 8 with Examples 5 to 7 shows that when pumice is present in the reaction zone considerably higher space velocities can be used than when no contact material is present. Comparison of Example 6 with 7 and Example 8 with 9 shows that high space velocities usually give a lower percentage of trimethylamine decomposed but also permit a greater recovery in the form of mono- and dimethylamines, irrespective of the presence of an inert contact material.

Example 10

The mixture of ammonia and amines was mixed with air so that the molecular ratio of oxygen to trimethylamine was 3.18. This mixture was passed over a catalyst consisting of pumice particles coated with a mixture of 99.5 parts of ferric oxide and 0.5 parts of aluminum oxide, at 399° C. and a space velocity of 454. 98.0% of the trimethylamine was decomposed and of this only 14.8 mol. % was recovered as mono- and dimethylamines. Of the combined nitrogen present 16.7% was recovered as hydrogen cyanide.

Example 11

The process of Example 10 was carried out using pumice coated with cupric oxide as a catalyst at 399° C., a space velocity of 495 and a molecular ratio of oxygen to trimethylamine of 3.36. 76.8% of the trimethylamine was decomposed of which 74 mol. % was recovered as mono- and dimethylamines. Of the combined nitrogen present only 0.1% was converted to hydrogen cyanide.

Example 12

The same process was carried out using pumice coated with manganese pyrophosphate as a catalyst at 401° C., a space velocity of 432 and a molecular ratio of oxygen to trimethylamine of 2.74. 64.3% of the trimethylamine was decomposed of which 88.5 mol. % was recovered as mono- and dimethylamines. 0.4% of the combined nitrogen was converted to hydrogen cyanide.

The effect of various catalysts under approximately the same conditions is shown in Examples 9 to 12 inclusive. Inert pumice gives the lowest decomposition of trimethylamine but permits a much larger percentage of it to be recovered as mono- and dimethylamines. Ferric oxide causes almost complete elimination of the trimethylamine but the recovery of primary and secondary amines is very low. Cupric oxide and manganese pyrophosphate give intermediate results.

Example 13

The mixture of ammonia and amines was mixed with air so that the molecular ratio of oxygen to trimethylamine was 3.14 and this mixture was passed over pumice coated with ferric and aluminum oxides as shown in Example 10 at 330° C., and a space velocity of 517. 68% of the trimethylamine was decomposed of which 110 mol. % was recovered as mono- and dimethylamines. Of the combined nitrogen present 2.3% was converted to hydrogen cyanide.

Example 14

The process shown in Example 13 was carried out at 374° C., a space velocity of 480 and a molecular ratio of oxygen to trimethylamine of 3.09 using the same catalyst. 97.8% of the trimethylamine was decomposed but of this only 38.8% was recovered as mono- and dimethylamines. Of the combined nitrogen present 8.5% was converted to hydrogen cyanide.

Increasing the temperature, therefore, keeping other factors approximately constant leads to a greater decomposition of the trimethylamine, a lower recovery of the trimethylamine decomposed as mono- and dimethylamines and a greater production of hydrogen cyanide.

Example 15

The mixture of ammonia and amines was mixed with air so that the molecular ratio of oxygen to trimethylamine was 2.36 and this mixture was passed over the pumice-ferric oxide-aluminum oxide catalyst at 353° C. and a space velocity of 827. 71% of the trimethylamine was decomposed of which 90.5% was recovered as mono- and dimethylamines. Of the combined nitrogen 3% was converted to hydrogen cyanide.

Example 16

The same process as in Example 15 was carried out at 351° C., a space velocity of 842 and a molecular ratio of oxygen to trimethylamine of 10.85. 92.5% of the trimethylamine was decomposed of which 58.2% was recovered as mono- and dimethylamines. 9.8% of the combined nitrogen was converted to hydrogen cyanide.

Thus the other factors being approximately the same, an increase in the molecular ratio of oxygen to trimethylamine results in a greater decomposition of the trimethylamine with a consequent decrease in the amounts of mono- and dimethylamines recovered and an increase in the amount of hydrogen cyanide formed.

Example 17

The mixture of ammonia and amines was mixed with air so that the molecular ratio of oxygen to trimethylamine was 3.15 and this mixture was passed over the pumice-ferric oxide-aluminum oxide catalyst at 349° C. and a space velocity of 848. 81% of the trimethylamine was decomposed of which 81 mol. % was recovered as mono- and dimethylamines. 1.2% of the combined nitrogen was converted to hydrogen cyanide.

Example 18

The same process as in Example 17 was carried out except that the space velocity was 1300 instead of 848. 60.8% of the trimethylamine was decomposed of which 112 mol. % was recovered as mono- and dimethylamines. 1.5% of the combined nitrogen was converted to hydrogen cyanide.

These two examples show that the high space velocities result in a lower decomposition of the trimethylamine and a greater recovery of the trimethylamine decomposed as mono- and dimethylamines.

Example 19

A mixture made up of 88.3% by weight of ammonia, 9.4% of trimethylamine, 0.1% of dimethylamine and 2.2% of monomethylamine mixed with air so that the molecular ratio of oxygen to trimethylamine was 2.99. This mixture was passed over the pumice-ferric oxide-aluminum oxide catalyst at 367° C. and a space velocity of 1195. 97% of the trimethylamine was decomposed of which 65.2 mol. % was recovered as mono- and dimethylamines. 4.5% of the combined nitrogen was converted to hydrogen cyanide.

The reduction in the concentration of the trimethylamine in the ammonia as shown in Examples 1–19 is sufficient to permit the resulting mixture to be used in the further production of the amines from ammonia and methanol.

Example 20

A mixture composed of 26.6% by weight of ammonia, 69.9% of trimethylamine, 3.2% of dimethylamine and 0.3% of monomethylamine was passed over an aluminum phosphate-oxide catalyst at 454° C. and a space velocity of 247. 20.4% of the trimethylamine was decomposed, of which 210 mol. % was recovered as mono- and dimethylamines.

Examples 19 and 20 show that the process is applicable to mixtures of ammonia with the three methylamines in widely varying proportions.

In general high temperatures, low space velocities and high oxygen ratios give a greater decomposition of the trimethylamine but a lower recovery of mono- and dimethylamines. Low temperatures, high space velocities and low oxygen ratios give less decomposition of the trimethylamine and a higher recovery of the mono- and dimethylamines. In many cases the amount of mono- and dimethylamines recovered is greater molecularly than the amount of trimethylamine decomposed and this is probably due to direct reaction between the ammonia and the trimethylamine.

In carrying out this process commercially, it may be desirable to scrub the gases after decomposition of the trimethylamine with water in order to dissolve the ammonia and amines and to eliminate any insoluble gases such as nitrogen, oxygen, carbon monoxide and hydrocarbons. In case carbon dioxide and hydrogen cyanide are present in the reaction gases, it may be desirable to add a slight amount of alkali to the scrubbing water in order to permanently fix these gases in solution. The water solution may then be stripped of ammonia and amines by distillation in a suitable still and column, either under pressure or not, as desired. The mixture of ammonia and amines can then be separated by fractional distillation under pressure or the mixture can be returned to the amine converter system and reacted with additional methanol.

We claim:

1. In the process of separating ammonia from its mixtures with trimethylamine the step which comprises heating the mixture to temperatures of from 300° to 500° C. in the presence of oxygen.

2. In the process of separating ammonia from its mixtures with trimethylamine the step which comprises heating the mixture to temperatures of from 300° to 500° C. in the presence of oxygen and an inert contact material.

3. In the process of separating ammonia from its mixtures with trimethylamine the step which comprises heating the mixture to temperatures of from 300° to 500° C. in the presence of oxygen and an oxidation catalyst.

4. In the process of separating ammonia from its mixtures with trimethylamine and small amounts of mono- and dimethylamines the step which comprises converting the trimethylamine at least partially into mono- and dimethylamines by heating the mixture to temperatures of from 300° to 500° C. in the presence of oxygen.

5. In the process of separating ammonia from its mixtures with trimethylamine and small amounts of mono- and dimethylamines the step which comprises converting the trimethylamine at least partially into mono- and dimethylamines by heating the mixture to temperatures of from 300° to 500° C. in the presence of oxygen and an oxidation catalyst.

6. The process of separating ammonia from its mixtures with trimethylamine and small amounts of mono- and dimethylamines which comprises heating the mixture to temperatures of from 300° to 500° C. in the presence of oxygen to convert the trimethylamine at least partially into mono- and dimethylamines, scrubbing the gas with water, distilling the methylamines and ammonia from the aqueous solution and fractionally distilling the amines to separate the ammonia and the amines.

7. The process of separating ammonia from its mixtures with trimethylamine and small amounts of mono- and dimethylamines which comprises heating the mixture to temperatures of from 300° to 500° C. in the presence of oxygen and a ferric oxide-aluminum oxide catalyst to convert the trimethylamine at least partially into mono- and dimethylamines, scrubbing the gas with water, distilling the methylamines and ammonia from the aqueous solution and fractionally distilling the amines to separate the ammonia and the amines.

8. The process of separating ammonia from its mixtures with trimethylamines and small amounts of mono- and dimethylamines which comprises heating the mixture to temperatures of from 300° to 500° C. in the presence of oxygen and an oxidation catalyst to convert the trimethylamine at least partially into mono- and dimethylamines, scrubbing the gas with water, distilling the methylamines and ammonia from the aqueous solution and fractionally distilling the amines to separate the ammonia and the amines.

9. In the process of separating ammonia from its mixtures with trimethylamine the step which comprises heating the mixture to temperatures of from 300° to 500° C. in the presence of oxygen and a ferric oxide-aluminum oxide catalyst.

10. The process of converting trimethylamine into di- and monomethylamine which comprises heating a mixture of trimethylamine and ammonia to a temperature of from 300° C. to 500° C. in the presence of oxygen and an oxidation catalyst.

11. The process of converting trimethylamine into di- and monoethylamine which comprises heating a mixture of trimethylamine and ammonia to a temperature of from 300° C. to 500° C. in the presence of oxygen and a ferric oxide-aluminum oxide catalyst.

12. The process of converting trimethylamine into di- and monomethylamine which comprises heating a mixture of trimethylamine and ammonia to a temperature of from 300° C. to 500° C. in the presence of oxygen.

CHESTER E. ANDREWS.
ROBERT N. WASHBURNE.